United States Patent
Tang et al.

(10) Patent No.: US 9,001,257 B1
(45) Date of Patent: Apr. 7, 2015

(54) WAFER SCALE OPTICS

(75) Inventors: Tony K. Tang, Glendale, CA (US);
Roman C. Gutierrez, Arcadia, CA (US); Shawn Maloney, San Francisco, CA (US)

(73) Assignee: DigitalOptics Corporation MEMS, Arcadia, CA (US)

( * ) Notice: Subject to any disclaimer, the term of this patent is extended or adjusted under 35 U.S.C. 154(b) by 623 days.

(21) Appl. No.: 12/646,722

(22) Filed: Dec. 23, 2009

Related U.S. Application Data (60) Provisional application No. 61/140,504, filed on Dec. 23, 2008.

(51) Int. Cl.
*H04N 5/225* (2006.01)
*H04N 1/00* (2006.01)

(52) U.S. Cl.
CPC .................................. *H04N 1/00249* (2013.01)

(58) Field of Classification Search
CPC ...... G02B 3/0031; G02B 3/0075; G02B 7/08;
G02B 26/0875; G02B 7/02; B29D 11/00009;
H04N 5/2254; H04N 5/2253; H01L 27/14627
See application file for complete search history.

(56) References Cited

U.S. PATENT DOCUMENTS

| | | | | |
|---|---|---|---|---|
| 6,636,653 | B2 * | 10/2003 | Miracky et al. | 385/14 |
| 7,359,130 | B1 * | 4/2008 | Calvet | 359/819 |
| 7,663,686 | B2 * | 2/2010 | Chen | 348/335 |
| 7,813,634 | B2 * | 10/2010 | Gutierrez et al. | 396/133 |
| 7,920,343 | B2 * | 4/2011 | Lake et al. | 359/819 |
| 8,004,780 | B2 * | 8/2011 | Gutierrez et al. | 359/824 |
| 2005/0099532 | A1 * | 5/2005 | Tseng | 348/374 |
| 2006/0204242 | A1 * | 9/2006 | Gutierrez et al. | 396/439 |
| 2007/0097249 | A1 * | 5/2007 | Korenaga | 348/335 |
| 2007/0122132 | A1 * | 5/2007 | Misawa et al. | 396/55 |
| 2010/0123209 | A1 * | 5/2010 | Duparre et al. | 257/432 |

* cited by examiner

*Primary Examiner* — Luong T Nguyen
(74) *Attorney, Agent, or Firm* — Hayne and Boone LLP (57) ABSTRACT

A device can have an optical component having at least one alignment/attachment feature and a MEMS structure having a complimentary alignment/attachment feature for each alignment/attachment feature of the optical component. Each alignment/attachment feature of the optical component can mate with a corresponding alignment/attachment of the MEMS structure to align and/or attach the optical component to the MEMS structure. Thus, improved combinations of optical components and MEMS devices can be provided.

17 Claims, 6 Drawing Sheets

WAFER SCALE OPTICS

PRIORITY CLAIM

This patent application claims the benefit of the priority date of U.S. provisional patent application Ser. No. 61/140,504, filed on Dec. 23, 2008 and entitled WAFER SCALE OPTICS pursuant to 35 USC 119. The entire contents of this provisional patent application are hereby expressly incorporated by reference.

TECHNICAL FIELD

The present invention relates generally to optics. The present invention relates more particularly, for example, to the integration, alignment, securing, and assembly of microelectromechanical systems (MEMS) and optical components.

BACKGROUND

Both optical components (such as lenses) and micro-electromechanical systems (MEMS) are known. Optical components and MEMS devices are commonly used separately in various applications. However, the integration of optical components with MEMS devices presents substantial challenges.

There is a trend to include more features in various personal electronic devices, such as personal computers, laptops, cellular telephones, and the like. However, in doing so factors such as cost, size and power consumption must be addressed. More features typically require more room as additional components are disposed inside of a small housing. The prior art has attempted to provide solutions by reducing the size of the components, which today has met only with limited success due issues such as increased manufacturing cost and component reliability.

As such, although the prior art has recognized, to a limited extent, the problems associated with reduced device size, the proposed solutions have, to date, been ineffective in providing a satisfactory remedy. Therefore, it is desirable to provide improved combinations of optical components and MEMS devices.

BRIEF SUMMARY

According to an embodiment, a device can comprise an optical component having at least one alignment/attachment feature and a MEMS structure having a complimentary alignment/attachment feature, generally for each alignment/attachment feature of the optical component. Each alignment/attachment feature of the optical component can generally mate with a corresponding alignment/attachment of the MEMS structure to align and/or attach the optical component to the MEMS structure.

According to an embodiment, a device can comprise a plurality of lenses and each lens can have one or more alignment/attachment features. The device can comprise a first MEMS structure generally having a complimentary alignment/attachment feature for each alignment/attachment feature of the lenses. The alignment/attachment features of the lenses can mate with the alignment/attachment features of the first MEMS structure to align and attach the lenses to the first MEMS structure.

According to an embodiment, a method for aligning/attaching one or more lenses to one another and/or to a structure can comprise attaching mating features of the lens(se) to complimentary mating features of a MEMS structure.

According to an embodiment, a device can comprise a method for manufacturing optical electronics. The method can comprise using a plurality of MEMS structures for aligning a plurality of optical components during assembly of the optical components.

According to an embodiment, a device can comprise a camera formed by a process comprising the stacking of substantially stationary and substantially moveable components. One or more of the substantially stationary components can be formed at a wafer level. Similarly, one or more of the substantially moveable components can be formed at the wafer level. The movable components can comprise optical components such as lenses, for example. The movable components can comprise actuators for moving the optical components, for example. The movable components can comprise any desired components.

According to an embodiment, a device can comprise a camera formed by a process comprising stacking of components including lenses. One or more of the lenses can be movable. One or more of the lenses can be mounted in a silicon piece (such as a holder or mount) to center the lenses and/or to facilitate compensation for a thermal coefficient of expansion difference between the lens and the silicon piece.

According to an embodiment, a device can comprise a camera formed by a process comprising the stacking wafer level components. One or more of the components can comprise an actuator, e.g., a MEMS actuator.

Thus, improved combinations of optical components and MEMS devices can be provided. These and other features and advantages of the present invention will be more readily apparent from the detailed description of the embodiments set forth below taken in conjunction with the accompanying drawings.

BRIEF DESCRIPTION OF THE DRAWINGS

Aspects of the present invention and their advantages are best understood by referring to the detailed description that follows. It should be appreciated that like reference numerals are used to identify like elements illustrated in one or more of the figures.

DETAILED DESCRIPTION

According to an embodiment, a MEMS device can be used to align one or more lenses to another structure (such as a MEMS structure) in a manner that tends to minimize the use of additional components so as to facilitate a desirable reduction in the overall device size, number of components, and power requirements.

According to an embodiment, a device can comprise an optical component having at least one alignment/attachment feature and a MEMS structure generally having a complimentary alignment/attachment feature for each alignment/attachment feature of the optical component. Each alignment/attachment feature of the optical component can generally mate with a corresponding alignment/attachment of the MEMS structure to align and/or attach the optical component to the MEMS structure.

The optical component can comprise one or more lenses, for example. The optical device can comprise any other desired optical component or combination of optical components. For example, the optical component can comprise any desired combination of lenses, imagers, diffraction gratings, mirrors, and prisms. Non-optical components can similarly be attached and/or aligned. For example, various MEMS structures can be aligned and/or attached to one another. As a further example, an actuator, such as a MEMS actuator, can be aligned and/or attached to a MEMS structure.

The alignment/attachment feature(s) of the optical component can comprise male alignment/attachment feature(s) and the alignment/attachment of the MEMS structure can comprise female alignment/attachment feature(s). The alignment/attachment feature(s) of the optical component can comprise female alignment/attachment feature(s) and the alignment/attachment of the MEMS structure can comprise male alignment/attachment feature(s). Any desired combination of male and female alignment/attachment features can be used.

For example, the alignment/attachment feature(s) of the lens can comprise protrusion(s) and the alignment/attachment of the MEMS structure can comprise cutout(s) that are configured to receive the alignment/attachment feature of the lens. The protrusions and the cutouts can have the same shapes, e.g., both be generally round, can have similar shapes, e.g., one be round and the other be oval, and/or can have different shapes, e.g. one be square and the other can be round. The use of similar and different shapes can provide for the use of placement tools, can result in tighter fits, and/or can define voids within which bonding agents (such as excess bonding agent) can be disposed.

According to an embodiment, a device can comprise a plurality of lenses and each lens can have one or more alignment/attachment features. The device can comprise a first MEMS structure generally having a complimentary alignment/attachment feature for each alignment/attachment feature of the lenses. The alignment/attachment features of the lenses can mate with the alignment/attachment features of the first MEMS structure to align and attach the lenses to the first MEMS structure.

The alignment/attachment features of two or more of the lenses (or other devices or structures) can mate with the same single alignment/attachment feature of the first MEMS structure. In this manner, two male alignment/attachment members can mate with a single female alignment/attachment member, for example.

A plurality of lenses can mate with the same first MEMS structure to define a lens array. The lens array can comprise any desired combination of lenses and/or other optical components.

One or more additional lenses can mate with the same first MEMS structure. For example, one or more second MEMS structures can attach to the first MEMS structure so as to facilitate the alignment and/or attachment of at least one additional lens to the first MEMS structure. Any desired number of additional or second MEMS structures and/or any desired number of additional lenses can be attached to the first MEMS structure. Such second MEMS structures can add optical components to the same optical path or to different optical paths.

The first and second MEMS structures can comprises silicon. The first and second MEMS structures can comprise any material suitable for fabrication at a wafer level. The first and second MEMS structures can comprise any material suitable for fabrication using MEMS fabrication techniques. The first and second MEMS structures can comprise any material suitable for fabrication using integrated circuit-like and/or photolithographic techniques.

According to an embodiment, a method for aligning/attaching one or more lenses to one another and/or to a structure can comprise attaching mating features of the lens(se) to complimentary mating features of a MEMS structure.

According to an embodiment, a device can comprise a method for manufacturing optical electronics wherein the method comprises using a plurality of MEMS structures for aligning a plurality of optical components during assembly of the optical components.

The optical components can attach to the MEMS structure via alignment/attachment features of the optical components and via alignment/attachment features of the MEMS structure. For example, the optical components can snap to the MEMS structure.

The MEMS device can comprise silicon, an alloy, a metal, or a plastic. The MEMS device can comprise means for alignment of optical components in a linear, stackable fashion. The means for attaching optical components can comprise fasteners, screws, adhesive bonding, welding, soldering, clamping, snapping clasps or any other desired means.

According to an embodiment, a device can comprise a camera formed by a process comprising the stacking of substantially stationary and substantially moveable components. One or more of the substantially stationary components can be formed at a wafer level. Similarly, at least one of the substantially moveable components can be formed at the wafer level.

According to an embodiment, a device can comprise a camera formed by a process comprising stacking of components including lenses. One or more of the lenses can be mounted in a silicon piece to center the lenses and/or to facilitate compensation for a thermal coefficient of expansion difference between the lens and the silicon piece.

According to an embodiment, a device can comprise a camera formed by a process comprising stacking wafer level components. One or more of the components can comprise an actuator, e.g., a MEMS actuator.

Figure 1A:
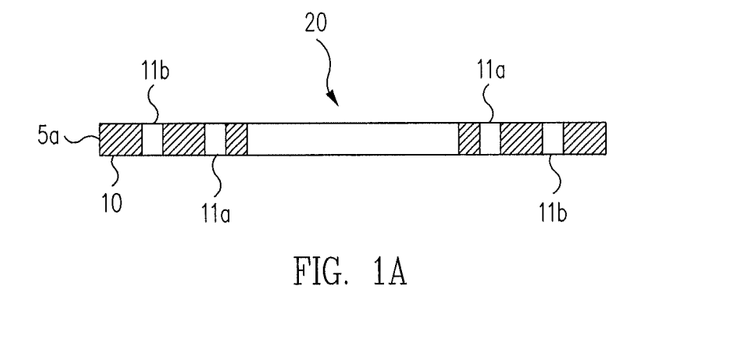
FIG. 1A is a cross-sectional side view of a silicon substrate, such as that of a MEMS device, having alignment/attachment features formed therein, according to an embodiment.
Figure 1B:
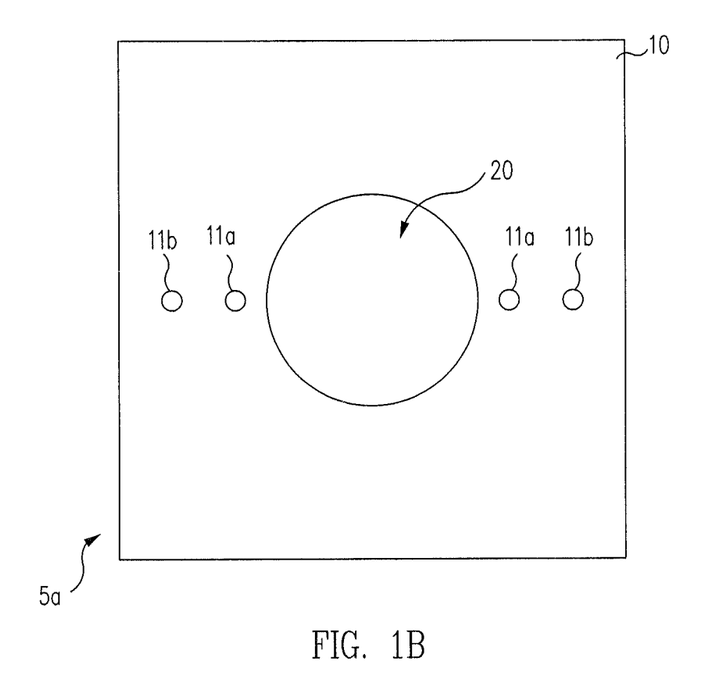
FIG. 1*b* is a plan view of the silicon substrate of FIG. 1A, according to an embodiment.

As shown in FIGS. 1A and 1B, a monolithic, generally planar, silicon piece or MEMS structure 5a can have alignment/attachment features 11a and 11b such as slots grooves, holes, depressions, or cutouts formed therein, according to an embodiment. An opening 20 can be formed in the MEMS structure 5 to accommodate the light path of one or more optical components, as discussed below.

Figure 2:
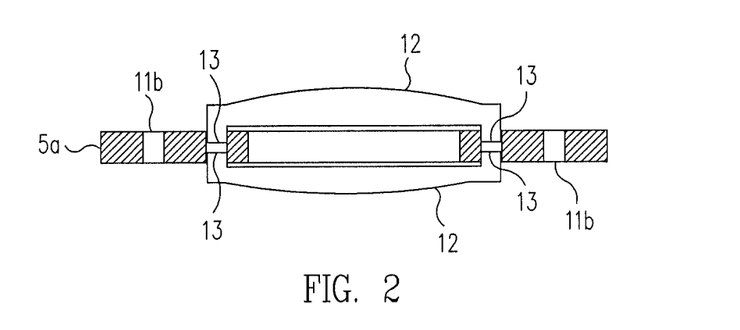
FIG. 2 is the cross-sectional side view of the silicon substrate of FIG. 1, having two optical components, i.e., lenses, attached thereto, according to an embodiment.

As shown in FIG. 2, one or more lenses 12 can be attached to the MEMS structure 5a via alignment/attachment features 13 of the lenses 12. For example, the alignment/attachment features 13 of the lenses 12 can comprise protrusions such as posts, tabs, or bosses that extend into the complimentary alignment/attachment features 11a of the MEMS structure 5a. Thus, the lenses 12 can have male alignment/attachment features 13 and the MEMS structure 5a can have female alignment/attachment features 11a. Alternatively, the lenses 12 can have female alignment/attachment features and the MEMS structure 5a can have male alignment/attachment features.

More than one lens 12 can attach to the MEMS structure 5a using a given set of alignment/attachment features 13 of the MEMS structure 5a. Thus, two lenses 12 can attach (one from above and one from below) to the MEMS structure 5a using attachment features 13. Other attachment features of the MEMS structure 5a can be used to attach other lenses as discussed below.

The alignment/attachment features 13 of the lenses 12 and the alignment features 11a and 11b of the MEMS structure 5a can friction fit to one another. Alternatively, adhesive bonding, fasteners, or any other desired method can be used to attach the lenses 12 and the MEMS structure 5a to one another via the alignment/attachment features 11a, 11b and 13.

Figure 3:
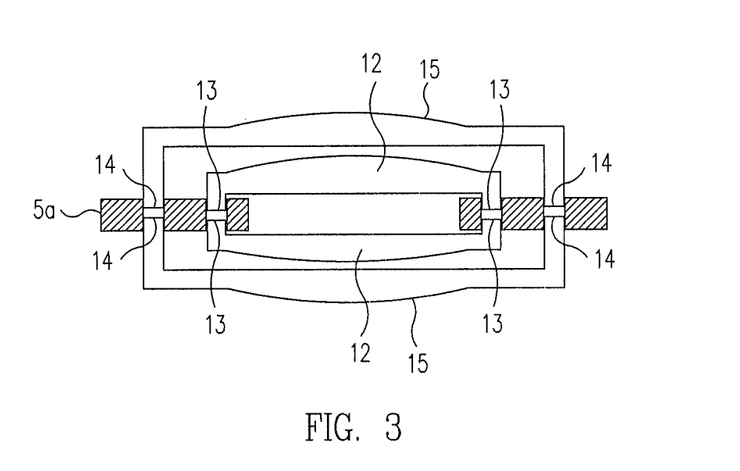
FIG. 3 is the cross-sectional side view of the silicon substrate of FIG. 2, having two additional optical components, i.e., lenses, attached thereto, according to an embodiment.
Figure 4:
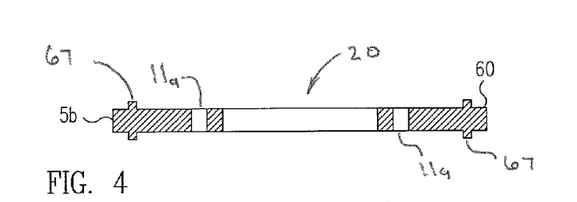
FIG. 4 is a cross-sectional side view of a silicon substrate, such as that of a MEMS device, having alignment/attachment features formed therein, according to an embodiment.
Figure 5:
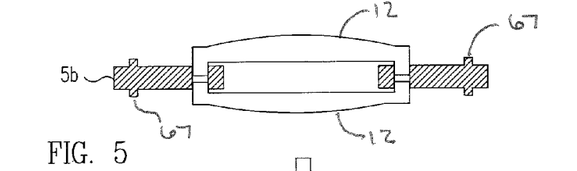
FIG. 5 is the cross-sectional side view of the silicon substrate of FIG. 4, having two optical components, i.e., lenses, attached thereto according to an embodiment.
Figure 6:
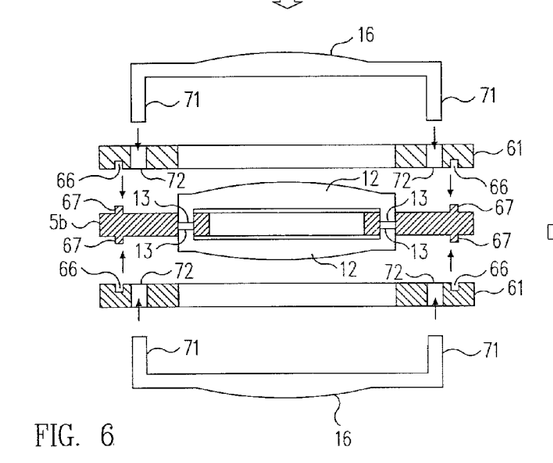
FIG. 6 is the cross-sectional side view of the silicon substrate of FIG. 5, having two additional optical components, i.e., lenses, positioned for attachment thereto via two addition structures such as two additional MEMS structures, according to an embodiment.

As shown in FIG. 3, additional lenses 15 can also be attached to MEMS structure 5a via alignment/attachment features 14. One lens 15 can be attached over and can nest another lens 12. Similarly, another lens 15 can be attached under and can nest another lens 12. In this manner, any desired number of lenses can be attached to and/or aligned with respect to the MEMS structure 5a, as well as with respect to one another.

As shown in FIGS. 4-7, additional components 61 can be used to better attach additional lenses 16 and/or the MEMS structure to one another, according to an embodiment. The use of such additional components 61 can reduce the complexity of a MEMS structure (such as that of FIGS. 1 and 2) by eliminating some of the cutouts (such as alignment/attachment features 11b) that would otherwise be needed to attach the additional lenses.

Male 67 and female 66 alignment/attachment features can be used to attach the additional components 61 to the MEMS structure 60. The additional components can be optical components, MEMS structures, or any other desired components.

Figure 7:
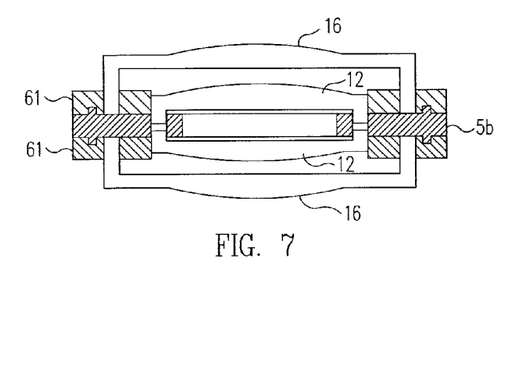
FIG. 7 is the cross-sectional side view of the silicon substrate of FIG. 6, having the two additional optical components, i.e., lenses, attachment thereto, according to an embodiment.

More particularly, female alignment/attachment features 66 of the additional components 61 can receive complimentary male alignment/attachment features 67 of the MEMS structure 60 to attach the additional components 61 to the MEMS structure 60. Additional lenses 16 or other desired components can be attached to the additional components 61, such as via male alignment/attachment features 71 of the lenses 16 and female alignment/attachment features 72 of the other components 61, as shown in FIG. 7.

Figure 8:
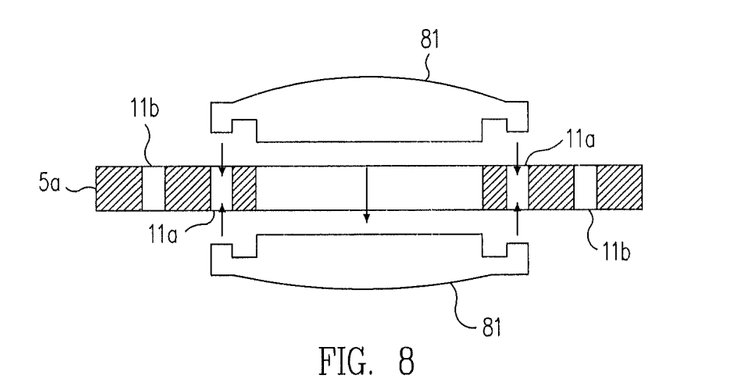
FIG. 8 is a cross-sectional side view of a silicon substrate, such as that of a MEMS device, having alignment/attachment features formed therein and having optical components, i.e., lenses, positioned for attachment thereto, according to an embodiment.
Figure 9:
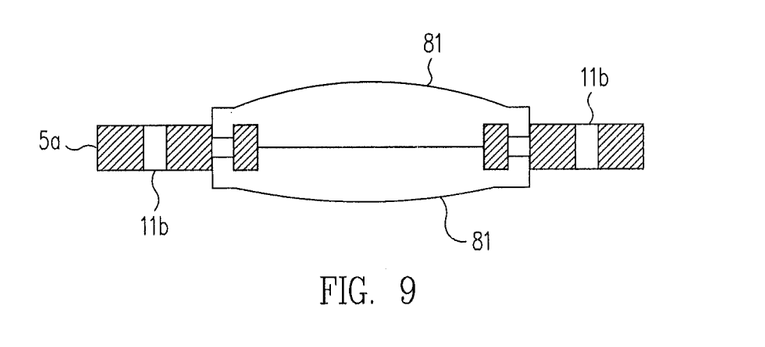
FIG. 9 is the cross-sectional side view of the silicon substrate of FIG. 8, having alignment/attachment features formed therein and having optical components, i.e., lenses, attached thereto, according to an embodiment.

FIGS. 8 and 9 show alignment and assembly of two lenses with respect to a MEMS structure wherein both lenses are aligned and attached using the same alignment/attachment features of the MEMS structure, according to an embodiment. The lenses shown in FIGS. 8 and 9 are plano-convex lenses wherein the plano side of each abuts the plano side of the other. Non-abutting plano-convex lenses can be uses, as shown in FIGS. 2-7. Indeed, any desired types and configuration of lenses can be used.

Figure 10:
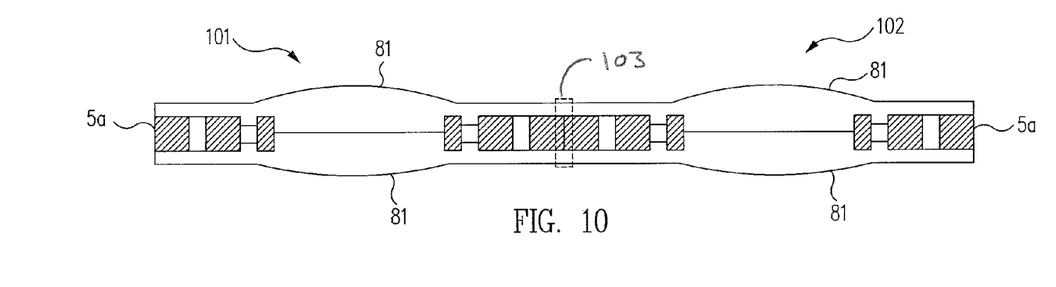
FIG. 10 is a cross-sectional side view of a silicon substrate, such as that of two MEMS devices, having alignment/attachment features formed therein, having optical components, i.e., lenses, attached thereto, and having separation features/marks formed therein and/or thereon, according to an embodiment.
Figure 11:
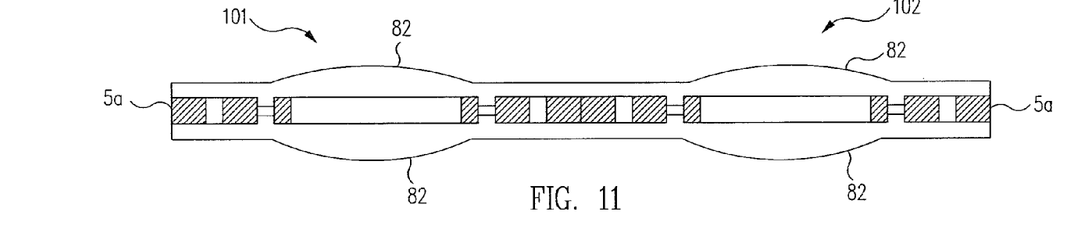
FIG. 11 is a cross-sectional side view of a silicon substrate, such as that of two MEMS devices, having alignment/attachment features formed therein, having optical components, i.e., lenses, attached thereto and having separation features/marks formed therein and/or thereon, according to an embodiment.
Figure 12:
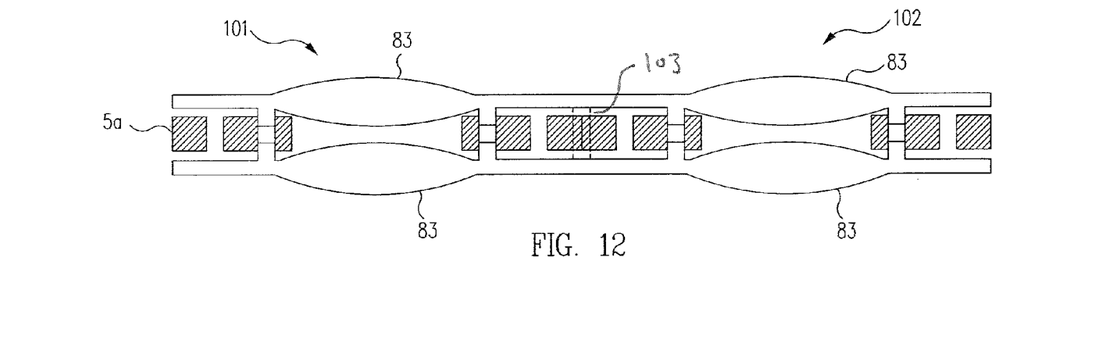
FIG. 12 is a cross-sectional side view of a silicon substrate, such as that of two MEMS devices, having alignment/attachment features formed therein, having optical components, i.e., lenses, attached thereto and having separation features/marks formed therein and/or thereon, according to an embodiment.

FIGS. 10-12 show the alignment and integration of optical elements into an array, according to various embodiments. The array can comprise a plurality of separate lens assemblies 101 and 102. Any desired number of lens assemblies can be provided.

Individual lens assemblies 101, 102 can be separated from one another, such as via device separation features 103. The device separation features 103 can be scores formed in or partially etched through portions of the substrate of the MEMS structure 5a.

A one dimension array can be provided by configuring a plurality of such lens assemblies in a single row. A two dimensional array can be provided by configuring a generally planar plurality of such lens assemblies in rows and columns. A three dimensional array can be provided by configuring a plurality of two dimensional arrays in a stack.

With particular reference to FIG. 10, plano-convex lenses 81 are attached to a MEMS structure 5a such that their plano sides substantially abut. With particular reference to FIG. 11, plano-convex lenses 82 are attached to a MEMS structure 5a such that their plano sides do not substantially abut. With particular reference to FIG. 12, convex-convex lenses 83 are attached to a MEMS structure 5a such that their convex sides do not substantially abut.

Figure 13:
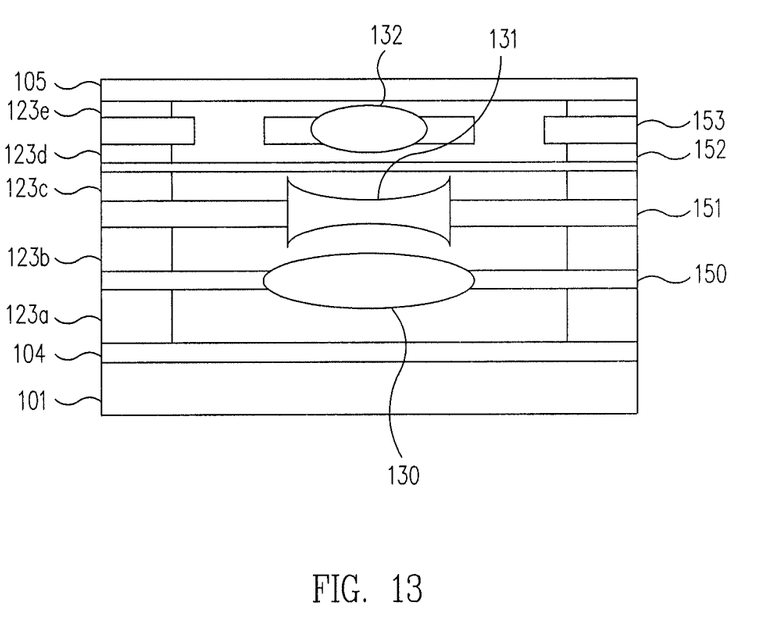
FIG. 13 is a cross-sectional side view of a stack of silicon substrates, such as MEMS devices, and optical components, i.e., lenses, wherein at least some of the optical components can be movable, according to an embodiment.

FIG. 13, shows a lens stack that can be provided by configuring a plurality of such lens assemblies and other components that are arranged one above the other, according to an embodiment. Such a stack can define a camera, for example, as discussed in detail below.

Components of the stack, such as lens and MEMS structures, can be aligned and/or attached with respect to one another using alignment/attachment features as described with respect to FIGS. 1-12 above. For example, lenses can be aligned with respect to lens mounts or spacers (and consequently with respect to other components of the stack) and can be attached to the lens mounts or spacers using such alignment/attachment features.

According to an embodiment, imager 101 can define a substrate upon which additional components of the camera are stacked. An infrared (IR) filter or IR cut window 104 can be disposed upon the imager 101. The imager 101 can detect an image and can convert the image into an electrical signals according to well know principles. For example, the imager 101 can be a CMOS image sensor. The IR cut window 104 can substantially inhibit IR light from being incident upon the imager 101, such as in accordance with specifications provided by imager's manufacturer.

A first lens 130 can be bonded upon the IR cut window 104, such as by using at least one spacer 123a to provide the desired spacing between the first lens 130 and the imager 101. A mount 150 for the first lens 130 can be part of the lens 130 itself or can be a separate piece into which the lens is bonded or attached.

Upon the first lens 130 a second lens 131 can be bonded, such as by using at least one second spacer 123b to obtain desired spacing. Again, the lens mount 151 can be a part of the second lens 131 or can be separate with respect thereto. A shutter 152 can be bonded upon the second lens 131, such as by using at least one spacer 123c to obtain desired spacing and to ensure that the shutter does not come into contact with the lens 131.

A moveable lens 132 can be used for focusing. The moveable lens 132 can be bonded to a MEMS actuator 153, such as by using at least one spacer 123d to obtain desired spacing. A window 105 can be attached to the top of the stack, such as by using at least one spacer 123e to obtain desired spacing.

Some of these components can be omitted depending on the application. For example, if a shutter is not required for the camera, then the shutter 152 and corresponding spacers 123c can be omitted. As another example, the IR cut window 104 can be moved to the front window 105, and the window on top of the imager 104 can be omitted. In some instances, the IR cut window 104 can be omitted.

Such a stack can be formed by a wafer level process in which the imagers, such as CMOS imagers, are still on the wafer, the lenses are still on wafers, and/or the shutter and/or AF actuators are still on wafer. The wafers can all be stacked and bonded, and afterwards the individual wafer level assembled cameras can be singulated. The singulation can be done by dicing, by etching, or any other process that physically separates the parts without substantial damage to the components. In some cases, some of the components may not be provided at wafer level and can be individually assembled on other components that are provided at wafer level. For example, the third lens 132 can be separate lenses that are mounted into a wafer of actuators.

In another embodiment, lenses 130, 131, and/or 132 can be individual (unmounted), whether or not formed by a wafer level process, and can be mounted into silicon wafers of lens mount 150, lens mount 151, and/or MEMS actuator 153. Lens mount 150, lens mount 151, and/or MEMS actuator 153 can have features that facilitate alignment the lenses 130, 131, and/or 132, whether or not these lenses are moveable. For example, flexures on the silicon wafers of lens mount 150, lens mount 151, and/or MEMS actuator 153 can be used to center the lenses and/or to compensate for different coefficient of thermal expansion of the lens and the silicon.

All of the parts that are bonded together can be made out of silicon. Making such parts out of silicon can provide enhanced alignment across the wafer for all stacked elements.

In another embodiment, the MEMS actuator 153 can be capable of moving the at least one of the lenses 130, 131, and/or 132 in tip, tilt and/or laterally so as to facilitate image stabilization. Such image stabilization can be facilitated by changing the looking angle of the camera in a way that maintains pointing constant in inertial space and compensates for motion of the camera caused by unsteady holding or other external disturbance such as machine vibration.

The MEMS actuator 153 can have shared duties of focusing and image stabilization. Alternatively, two separate MEMS actuators 151 and 153 can be used, wherein one of these MEMS actuators 151 performs the image stabilization function, and the other 153 performs the focusing function.

Driver electronics can be incorporated directly on the MEMS actuators 151, 153, or can be in a separate chip that can be attached on top of the imager 101, on one of the MEMS actuators 151, 153, or at any other desired location.

As used herein, the term "alignment/attachment feature" can be used to describe a feature that can be used for alignment, attachment, or both alignment and attachment.

The lens(es) can comprise plastic, glass, or any other desired material. The alignment/attachment features of the glass can be formed by molding, etching, milling, grinding, machining, or any other desired method.

Thus, according to one or more embodiments, a very compact autofocus (AF) and shutter camera can be provided. Advanced camera features such as image stabilization can be incorporated into such cameras.

The MEMS structure can comprise silicon, plastic, metal, or any other desired material. The alignment/attachment features and other features of the MEMS structure can be formed by photolithography, etching, milling, grinding, machining, and/or any other desired method.

In view of the foregoing, more features can more readily be provided for various personal electronic devices, such as personal computers, laptops, cellular telephones, and the like. For example, smaller miniature cameras can be provided for such personal electronic devices. Issues such as cost, size and power consumption can be addressed favorably. This can be facilitated by providing improved combinations of optical components and MEMS devices.

Aspects described herein illustrate, but do not limit, the invention. It should also be understood that numerous modifications and variations are possible in accordance with the principles of the present invention. Accordingly, the scope of the invention is defined only by the following claims.

We claim:

1. A device comprising:
    a first lens having a contiguous portion that forms an alignment/attachment feature for the first lens;
    a second lens having a contiguous portion that forms an alignment/attachment feature for the second lens;
    a planar micro-electromechanical system (MEMS) structure disposed in a plane that is perpendicular to a common optical axis of the first and second lenses and having a complimentary alignment/attachment feature disposed perpendicular to the planar MEMS structure;
    wherein the alignment/attachment features of the first and second lenses are each disposed perpendicular to the planar MEMS structure and each engages with the same alignment/attachment feature of the planar MEMS structure to align attach the first and second lenses to opposing sides of the planar MEMS structure;
    wherein the planar MEMS structure comprises silicon, an alloy, a metal, or a plastic; and
    wherein the alignment/attachment features of the first and second lenses each comprises a protrusion and the complimentary alignment/attachment feature of the planar MEMS structure comprises a cutout that is configured to receive the alignment/attachment features of the first and second lenses.

2. The device as recited in claim 1, wherein the alignment/attachment feature of the first lens comprises a male alignment/attachment feature and the complimentary alignment/attachment feature of the planar MEMS structure comprises a female alignment/attachment feature.

3. A device comprising:
a plurality of lenses, each lens having a contiguous portion that forms at least one alignment/attachment feature for that lens;
a planar micro-electromechanical system (MEMS) structure having a complimentary alignment/attachment feature for each alignment/attachment feature of the plurality of lenses, wherein each complementary alignment/attachment feature of the planar MEMS structure is disposed perpendicular to the planar MEMS structure;
wherein the alignment/attachment features of the plurality of lenses are disposed perpendicular to the planar MEMS structure and engage with the complimentary alignment/attachment features of the planar MEMS structure to align and attach the plurality of lenses to the planar MEMS structure;
wherein the plurality of lenses comprises at least first and second lenses;
wherein the alignment/attachment features of the at least first and second lenses each engages with the same complimentary alignment/attachment feature of the planar MEMS structure to align and attach the at least first and second lenses to opposing sides of the planar MEMS structure;
wherein the planar MEMS structure is disposed in a plane that is perpendicular to a common optical axis of the at least first and second lenses;
wherein the planar MEMS structure comprises silicon, an alloy, a metal, or a plastic; and
wherein the alignment/attachment features of the at least first and second lenses each comprises a protrusion and at least one complimentary alignment/attachment feature of the planar MEMS structure comprises a cutout that is configured to receive the alignment/attachment features of the at least first and second lenses.

4. The device as recited in claim 3, wherein the alignment/attachment features of at least an additional two of the plurality of lenses mate with different complimentary alignment/attachment features of the planar MEMS structure.

5. The device as recited in claim 3, wherein the plurality of lenses mate with the same planar MEMS structure to define a lens array.

6. The device as recited in claim 3, wherein at least one additional lens mates with the same planar MEMS structure.

7. The device as recited in claim 3, wherein the planar MEMS structure comprises silicon.

8. A method for aligning/attaching one or more lenses to one another and/or to a structure, the method comprising:
attaching mating features of at least first and second lenses to complimentary mating features of a planar micro-electromechanical system (MEMS) structure,
wherein the mating features of the at least first and second lenses are formed from contiguous portions of the at least first and second lenses,
wherein the attaching comprises inserting the mating features of the at least first and second lenses into the complementary mating features of the planar MEMS structure by moving the at least first and second lenses toward opposing surfaces of the planar MEMS structure along a common optical axis of the at least first and second lenses;
wherein the planar MEMS structure is disposed in a plane that is perpendicular to the common optical axis of the at least first and second lenses and the complimentary mating features are disposed perpendicular to the planar MEMS structure,
wherein the mating features of the at least first and second lenses are each disposed perpendicular to the planar MEMS structure and each engages with the same complimentary features of the planar MEMS structure to align and attach the at least first and second lenses to opposing sides of the planar MEMS structure,
wherein the planar MEMS structure comprises silicon, an alloy, a metal, or a plastic; and
wherein the mating features of the at least first and second lenses each comprises a protrusion and at least one of the mating features of the planar MEMS structure comprises a cutout that is configured to receive the mating features of the at least first and second lenses.

9. A device comprising:
a plurality of lenses, each lens having a contiguous portion that forms at least one alignment/attachment feature;
a planar micro-electromechanical system (MEMS) structure having a complimentary alignment/attachment feature for each alignment/attachment feature of the plurality of lenses, wherein each complementary alignment/attachment feature of the planar MEMS structure is disposed perpendicular to the planar MEMS structure;
wherein the alignment/attachment features of at least first and second lenses of the plurality of lenses are each disposed perpendicular to the planar MEMS structure and each engages with the same complimentary alignment/attachment features of the planar MEMS structure to align and attach the at least first and second lenses to opposing sides of the planar MEMS structure;
wherein the planar MEMS structure is disposed in a plane that is perpendicular to a common optical axis of the at least first and second lenses;
wherein the planar MEMS structure comprises silicon, an alloy, a metal, or a plastic; and
wherein the alignment/attachment features of the at least first and second lenses each comprises a protrusion and the complimentary alignment/attachment feature of the planar MEMS structure comprises a cutout that is configured to receive the alignment/attachment features of the at least first and second lenses.

10. The device as recited in claim 9, wherein the alignment/attachment features of at least an additional two of the lenses mate with different alignment/attachment features of the planar MEMS structure.

11. The device as recited in claim 9, wherein the plurality of lenses mate with the same planar MEMS structure to define a lens array.

12. The device as recited in claim 9, wherein at least one additional lens mates with the same planar MEMS structure.

13. The device as recited in claim 9, wherein the planar MEMS structure comprises silicon.

14. The device as recited in claim 1, wherein the alignment/attachment feature of the first lens extends outwardly from a periphery of the first lens and then further extends orthogonally with respect to the first lens.

15. The device as recited in claim 3, wherein the alignment/attachment feature of each lens extends outwardly from a periphery of that lens and then further extends orthogonally with respect to that lens.

16. The method as recited in claim 8, wherein the mating features of the at least first and second lenses extend outwardly from the at least first and second lenses and then further extends orthogonally with respect to the at least first and second lenses.

17. The device as recited in claim 9, wherein the alignment/attachment feature of each lens extends outwardly from a periphery of that lens and then further extends orthogonally with respect to that lens.

\* \* \* \* \*